US007774940B2

(12) United States Patent
Frank

(10) Patent No.: US 7,774,940 B2
(45) Date of Patent: Aug. 17, 2010

(54) FOLDING KNIFE WITH PUZZLE PIECE LOCKING MECHANISM

(75) Inventor: Bram Frank, Clearwater, FL (US)

(73) Assignee: Dragon Nails, Inc., Clearwater, FL (US)

( * ) Notice: Subject to any disclaimer, the term of this patent is extended or adjusted under 35 U.S.C. 154(b) by 220 days.

(21) Appl. No.: 11/968,670

(22) Filed: Jan. 3, 2008

(65) Prior Publication Data

US 2009/0172951 A1 Jul. 9, 2009

(51) Int. Cl.
*B23B 1/04* (2006.01)

(52) U.S. Cl. ............................ 30/161; 30/155; 30/157; 30/160

(58) Field of Classification Search .................. 30/153, 30/155, 161, 330, 156, 157, 159, 160
See application file for complete search history.

(56) References Cited

U.S. PATENT DOCUMENTS

| | | | | | |
|---|---|---|---|---|---|
| 458,664 | A | * | 9/1891 | Scholz | 30/161 |
| 727,724 | A | * | 5/1903 | Weil | 30/161 |
| 1,169,000 | A | * | 1/1916 | Brown | 30/161 |
| 1,362,142 | A | * | 12/1920 | Rohrer | 30/161 |
| 1,362,143 | A | * | 12/1920 | Rohrer | 452/103 |
| 3,783,509 | A | * | 1/1974 | Lake | 30/161 |
| 4,040,181 | A | * | 8/1977 | Johnson | 30/161 |
| 4,347,665 | A | * | 9/1982 | Glesser | 30/161 |
| 4,563,813 | A | * | 1/1986 | Fortenberry | 30/161 |
| 4,570,341 | A | * | 2/1986 | Konneker | 30/161 |
| 4,854,045 | A | * | 8/1989 | Schaub | 30/155 |
| 4,896,424 | A | * | 1/1990 | Walker | 30/349 |
| 6,101,723 | A | * | 8/2000 | Ford | 30/157 |
| 6,256,887 | B1 | * | 7/2001 | Osborne | 30/161 |
| 6,553,672 | B2 | * | 4/2003 | Glesser et al. | 30/161 |
| 6,668,460 | B2 | * | 12/2003 | Feng | 30/161 |
| 6,732,436 | B2 | * | 5/2004 | Moizis | 30/155 |
| 7,059,053 | B2 | * | 6/2006 | Sakai | 30/160 |
| 7,062,856 | B2 | * | 6/2006 | Moser | 30/160 |
| 7,222,429 | B2 | * | 5/2007 | PerMar, Jr. | 30/161 |
| 7,469,476 | B2 | * | 12/2008 | Demko | 30/161 |
| 2004/0148781 | A1 | * | 8/2004 | PerMar, Jr. | 30/161 |
| 2005/0044717 | A1 | * | 3/2005 | Nishihara | 30/161 |
| 2007/0169351 | A1 | * | 7/2007 | Steigerwalt | 30/155 |

FOREIGN PATENT DOCUMENTS

| | | | | |
|---|---|---|---|---|
| EP | 1431010 | A2 | * | 6/2004 |
| JP | 02077286 | A | * | 3/1990 |
| JP | 10179945 | A | * | 7/1998 |
| JP | 11164971 | A | * | 6/1999 |
| JP | 2001259255 | A | * | 9/2001 |

* cited by examiner

*Primary Examiner*—Jason Daniel Prone
*Assistant Examiner*—Jennifer Swinney
(74) *Attorney, Agent, or Firm*—Dennis G. Lapointe

(57) ABSTRACT

A locking mechanism for a folding knife or tool with a handle having a cavity defined within the handle; a knife or tool blade having a heel-butt end with a female puzzle cavity portion cut out of a rear side of the heel-butt end, and the heel-butt end being rotationally interconnected to the front end of the handle wherein the knife or tool blade travels between an extended position and a closed position within the handle cavity; and a matching male puzzle portion at an end of a tang portion configured for engaging snugly and interconnectively with the female puzzle cavity portion at the heel-butt of the blade.

5 Claims, 11 Drawing Sheets

FOLDING KNIFE WITH PUZZLE PIECE LOCKING MECHANISM

FIELD OF THE INVENTION

The invention relates to cutting instruments and specifically to edged tools referred to as knives and more specifically to folding knives with locking mechanisms contained within them to prevent the inadvertent closing of the knife blade associated with folding knives during normal use, extreme or hard use, or the simple act of holding the folding knife, and unlike existing locking mechanisms the invention allows direct pressure against the locking motion.

BACKGROUND OF THE INVENTION

Cutting instruments or edged tools have been used by many types of people and industries for hundreds of years: all of them needing an edge that separates matter or simply cuts, be they crafts people, butchers, hunters, carpenters, warriors, law enforcement personnel or others. Edged tools allow for civilizations to grow and expand through the work that cutting tools enable us to do. Civilization depends on the act of cutting things. Over time these edged tools have gone from simple fixed blades, sometimes with big blades to easily transportable folding cutting tools: the folder being smaller in overall size than a fixed blade cutting tool. Folding meaning that the cutting edge or blade is able to fold or pivot into an enclosed handle or holster that encapsulates the sharp blade within the actual handle of the knife itself. A knife or edged tool with its own traveling encapsulated holster is such an example. This folding position allows for a smaller profile overall, safe carry, safe handling and transport of the cutting edged tool because the cutting edge is safely encapsulated within the handle with no exposed cutting edge. There are two possible positions of a folding knife: the first being that where the blade is closed or enclosed inside the handle and the second is where the blade is fully extended or open with its cutting edge exposed, thus allowing cutting work to be done.

Folding knives have become very popular because of their convenience of carry and use. The problem with folding knives is that unlike a fixed blade that cannot close onto ones fingers or hands while in use, a folding knife is by design constructed to fold, and can fold inadvertently and will close inadvertently if not prevented to by some sort of locking mechanism. Inadvertent folding or closing of a folding knife blade during use can lead to severe disfigurement and or loss of one's fingers and hand. Such inadvertent folding or closing can be a dangerous situation and many an old style slip joint folding knives were and are thought of as non working tools or dress knives because of the lack of a proper and safe locking mechanism: these tools are only used to do minor functions, not real work, because any undue pressure on the back of the blade will cause it to close. One can only put cutting pressure on the blade's front edge as back pressure or twisting can cause the blade to close on one's fingers. The second major issue with folding knives is that one needs a detent or indent or catch mechanism to hold the blade closed safely within the handle thereby only allowing the blade to come out or be exposed at the users demand or need. In other words knives need to be open or closed at the user's discretion not at the whim of the knife or situation that might arise.

Over the years many types of locking mechanisms and detents have been tried to keep the folding knifes blade either safely within the handle while closed or to keep it fully extended while the blade is exposed for use to prevent inadvertent closure of the blade. One of the oldest types and most commonly known of the simple locking mechanisms was the standard back lock mechanism. In a back lock mechanism, a longitudinal piece of a rigid material, such as steel or other metal or plastic, pivots around a pivot point near the forward portion of the back lock. By applying pressure to the rearward portion of the locking mechanisms lever, a forward portion rotates around the point (like a lever and a fulcrum action) releasing a tang type engagement from the upper part of the heel of the blade.

The heel includes a small shelf or step for the tang to set on top of. When the tang disengages, the blade is now allowed to pivot around from an open position to a closed position within the handle. Although it is simple to make and use, it is a simple lever and fulcrum action. To activate the fulcrum one only needs pressure on the end of the lever. As Archimedes posed, given a lever of sufficient length and a fulcrum to anchor it, the world can be moved. The problem with this is that the further one is from the fulcrum, the greater the length of the lever or the greater the force applied and the back lock is prone to fail, sometimes with catastrophic effect when excessive pressure is applied to the upper back edge of the exposed knife blade. Since within normal use or hard use of an edged tool, the user encounters this type of force either by direct or indirect action of the user, the back lock is a not a good choice of locking mechanism. This mechanism also rides under the user's hand and inadvertently one might disengage the lock with normal pressure of one's hands leading to the blade closing on one's fingers.

Another type of locking mechanism commonly used is called a liner lock. The liner lock is generally comprised of a leaf spring, usually made of metal which is part of the inside liner of the knife handle, hence its name, and it is interconnected with the liner and the handle with a section of the liner being cut to match the butt end of the knife blade. When the knife blade is exposed and the knife opened to an extended position, the forward edge of the cut end of the liner extends outward in an arc from the inside of the liner scale and positions itself behind the butt or heel of the blade. The contact that keeps the blade in an exposed or open position is the limited contact between the tang cut end of the liner and the heel or butt end of the knife. Liner locks tend to fail because of the "law of arcs" and position of the locking steel tang itself, which must always be at a set distance from its central pivot. The tang arms of the liner in coming out from the scale located within the handle cavity, must follow a pivot point and the tang cut end of the liner must travel in an arc, therefore, it cannot make full contact with the heel of the blade. Over the years people have tried to angle cut the butt or heel of the blade to encourage more contact with the tang cut end of the liner. The liner lock actually only contacts the heel or butt of the blade on the leading edge of the tang cut arm or the trailing edge of the tang cut arm. When one or both of these wear out or round off, catastrophic failure occurs and the lock fails to hold or lock the blade exposed or open, the lock inadvertently fails, and the folding knife actually folds and closes. The liner lock is also prone to failure due to excessive pressure on the back of the exposed blade. Under excessive pressure the liner lock has a tendency to bow or otherwise deform, due to the extended length of the liner lock and the nature of the material required to fit within the knife handle itself. The liner lock is so prone to failure that many liner locks now have additional locking mechanisms or pieces that have been invented to block the movement of the liner across the butt of the knife and serve to lock the liner lock. The liner lock also has a problem where the knife must be taken out of use position to disengage the lock and the lock release rides by one's index finger and under duress as with firearms, one tends to flex one's index finger releasing the blade. In firearms this involuntary motion gives us a negligent discharge.

Another type of lock is the compression lock which has three parts that must work in unison to function: a liner tang or ball, an anvil pin and a shelf for the tang or ball to rest on. It uses a compressive force generated over a short distance to lock the blade with a liner tang or a ball between the blade stop pin and a shelf or step on the heel of the blade. The configuration of the blade locking mechanism in theory would substantially stop the blade from failing or allowing inadvertent closing of the blade during use. When force is applied to the upper part of the blade commonly known as the back of the blade, the non-cutting surface, the tang of the knife locking mechanism is compressed between the anvil end of the knife blade and the anvil pin or stop pin located in the top of the handle. The compression lock would appear to be very strong but has several draw backs and points of immediate concern of failure. The compression lock is only as strong as the tiny screws that actually hold the anvil pin or stop pin into the sides of the scales or knife handle. If the screws fail from metal fatigue, a common problem in metal receiving constant vibration or impact, or work themselves loose, the stop/anvil pin will fall out and the blade will rotate completely around the back side of the blade as there will be no compression surface to compress against. The anvil pin itself must be specifically hardened so that it will not deform. If and when the anvil deforms the locking action stops and the blade cannot stay open. An anvil is a large metal device or object which is used by a black smith to pound out iron or steel to different shapes. The anvil pin in a Compression lock while in theory provides a compression surface, actually deforms and pounds the tang liner and the surface of the anvil pin out of shape much as a black smith does to regular steel and iron on his anvil. The biggest problem of a compression lock is that it needs to compress against a set anvil pin. Remove that pin, deform that pin and the compression lock fails to be a lock at all. In the compression lock, the normal stop pin is a two function pin serving s stopping the rotation of the blade and the compression backing on the blade and tang or ball itself.

The further development of a compression lock is that a ball is driven onto the shelf on the butt end of the blade by a spring and the ball is compressed between the anvil pin and the blade shelf. The ball rests on only two small points top and bottom in its action to keep the blade open. Not only does this have the same weaknesses as the basic compression lock but the lock releases by pulling on the exposed sides of the ball. In hard use or under duress one might actually disengage the lock and close the blade onto one's own fingers because of inadvertent pulling on the ball. The springs might fail or become trapped with foreign material stopping the lock from engaging.

There are many other types of locking mechanisms that use springs, rotating pieces, as well as complex mechanisms using springs and balls, and rotating disks, all of which are designed to prevent inadvertent closing of the knife blade. None of these mechanisms are simple in manufacture or use. All of them are expensive to manufacture and all work on the complexity factor which in chaos theory means the more complex something is, the easier it is to fail, for only a small part has to fail to make the whole mechanism inoperative. Therefore, there is a real need for a type of folding knife locking mechanism which is simple to use, simple to make and manufacture and provides real time strength, reliability and will prevent inadvertent blade closure under use, hard use or simple handling of the blade. It must be able to be closed in a user position without releasing ones grip on the tool.

In today's world, many folding knives are in use as Self Defense Response (SDR) tools, or Full Force Continuum tools and need to be used as most folding knives cannot be used, that is, putting extreme pressure against the back edge of the knife during use. The locking mechanisms in use today are not designed for leverage or force against the back of the blade, most or all will fail immediately, inadvertently closing on ones fingers. All existing locking mechanisms demand one remove one's hands from a user position to disengage the lock. Some releases actually need two hands to disengage the locking mechanism and even those that might be able to disengage with one hand all need two hands to safely disengage the locking mechanism.

The locking mechanism described below is designed to provide an answer to these issues.

SUMMARY OF THE INVENTION

The object of the present invention is to provide a folding knife locking mechanism which is basically undefeatable, that is, it cannot inadvertently close due to pressure or use and cannot suffer catastrophic failure when pressure is applied to the back edge of the knife blade when the knife blade is in an extended open position. Such a locking mechanism must be simple, account for wear and tear of use, and be self adjusting. Moreover, the locking mechanism of the present invention is specifically designed to accommodate extreme forces and withstand the application of external forces to the back of the extended blade unlike other locking mechanisms. Another object of the invention is to keep the locking mechanism simple, easy and inexpensive to manufacture, easy to use, and able to be used by many varieties of folding knife designs. It must also be able to be released or engage within the flow of use and without taking one's hands off of a safe user position.

Furthermore, it is an object of the invention to provide a locking mechanism which utilizes a very strong principle, the principle of interconnecting puzzle surfaces, providing an extended male puzzle piece on the tang lever of the inner scale of the handle that fits and interconnects within the female puzzle piece cavity positioned in the side and rear portion of the blade heel itself. When force is applied to the back edge of the extended knife blade the puzzle piece locks up snugly and interconnects within itself and as with a jig saw puzzle, all motion is stopped. There is no motion forward nor backward motion, and there is no up and down motion which can dislodge the puzzle piece: which must be removed exactly as it went in for that is its only path of possible operation. Puzzle pieces fit in only one direction. This principle has held the buildings of the Egyptians, the Mayans, the Romans, and others for thousands of years, with joints so tight that they cannot slip, with no mortar to hold them, joints so tight and precise that even a piece of paper cannot be slipped between them. This principle is the same as a carpenter's dovetail joint which is comprised of interlocking puzzle pieces that hold opposing boards together to make corners or extend the length of boards. This unique positioning of the liner tang puzzle piece allows the locking mechanism to withstand extreme forces applied against it and under hard use or antagonistic forces will hold the extended blade open. Only an exact opposite mirror image motion as compared to its entry motion can disengage a puzzle piece. This locking mechanism cannot inadvertently disengage, nor can it inadvertently close. This type of locking mechanism has three levels of complexity as with regular puzzles pieces. They include a simple puzzle lock, a compound puzzle lock, and a complex puzzle lock, all depending on the way the shape of the actual puzzle is made, with a simple protruding head, a protruding head with a simple side, either upper or lower, and finally, a protruding head with upper and lower sides. With upper or lower sides or both, the blade is forced to hold in several directions at once.

The puzzle lock provides for an adjustment to wear. Because steel does wear, it is further the object of the invention that the angle of the cuts and the radiuses of the surfaces of the puzzle pieces allow for an infinite amount of wear and change over time which allows the puzzle piece to set itself deeper into the locking position over time. The positioning of the lock release is such that in normal use of under duress one cannot accidentally disengage the lock. Squeezing pressure of one's hands or fingers would serve to only push the male puzzle piece deeper into the female puzzle opening.

To hold the blade closed and not inadvertently open when it should be closed for carry or safety there is a shallow female puzzle opening on the tang side of the blade. When in a closed position the male puzzle tang engages the shallow female puzzle opening and the blade is temporarily held closed until under direct force to open the blade one puts motion on the blade or ramp and the puzzle pieces disengage and the blade opens.

An example of the present invention is:

A folding knife with a puzzle locking mechanism is provided which generally comprises a handle having a front end, a rear end and a cavity defined within the handle; a handle having a set of liners within the cavity defined within the handle; a knife blade having a cutting edge and a heel-butt end with a female puzzle cavity piece cut out of the rear side of the heel-butt end, and the heel-butt end being rotationally interconnected to the front end of the handle wherein the knife blade travels between an extended position and a closed position with the knife blades cutting edge positioned within the handle cavity; and a stop pin positioned within an upper edge of the handle cavity for engaging and stopping basic rotation of the blade upon extending or exposing the blade and allowing the matching puzzle pieces male puzzle tang and female puzzle cavity to engage each other snugly and interconnectively.

A locking mechanism is positioned proximate to the handle cavity. The locking mechanism is comprised of a male puzzle tang releasing from the liner of the scale within the handle cavity, and positioned to interlock with the matching female puzzle cavity within the heel-butt portion of the blade and the stop pin when the knife blade is in the extended position or exposed for a position of use, blade motion is stopped, allowing the male puzzle piece to slip into and interlock with the female puzzle cavity within the rear butt heel portion of the blade on the extended knife blade. In this position, when pressure is applied downward on the upper edge or back of the knife blade, the male puzzle tang is snugly interconnected and locked within the female puzzle cavity of the blade and both the puzzle pieces interlock positively to prevent inadvertent closing of the knife blade and to eliminate forward and backward motion of the extended blade.

The knife blade can have a female detent, dimple or simple female puzzle cavity on the locking side of the blade to secondarily engage and lightly interconnect the male puzzle tang piece of the enclosed scale when the blade is closed or contained within the handle cavity holding the blade closed within.

DETAILED DESCRIPTION OF THE INVENTION

Figure 1A:
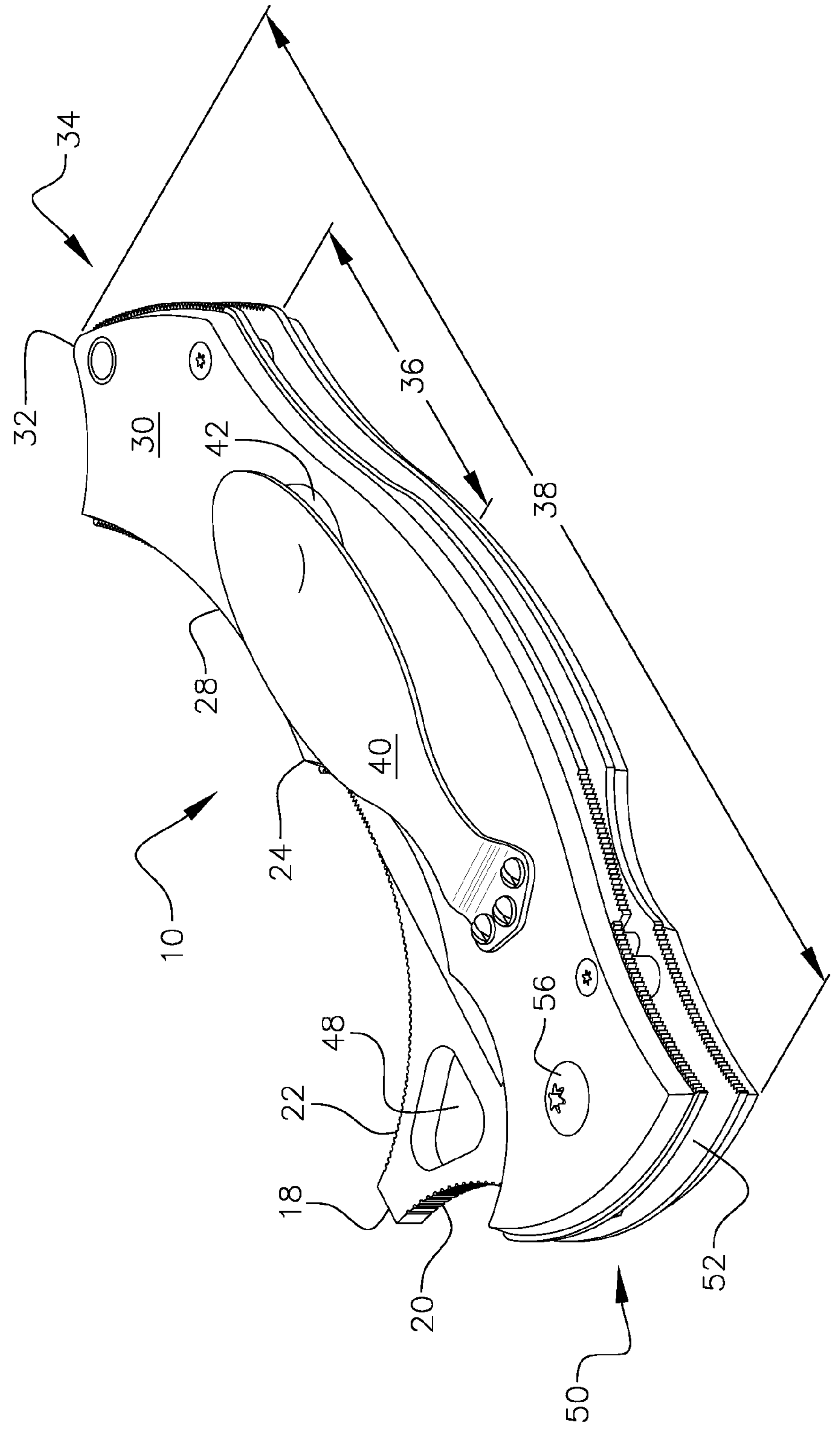
FIG. 1A is a conceptual depiction of an example of a folded knife on its clip side.
Figure 1B:
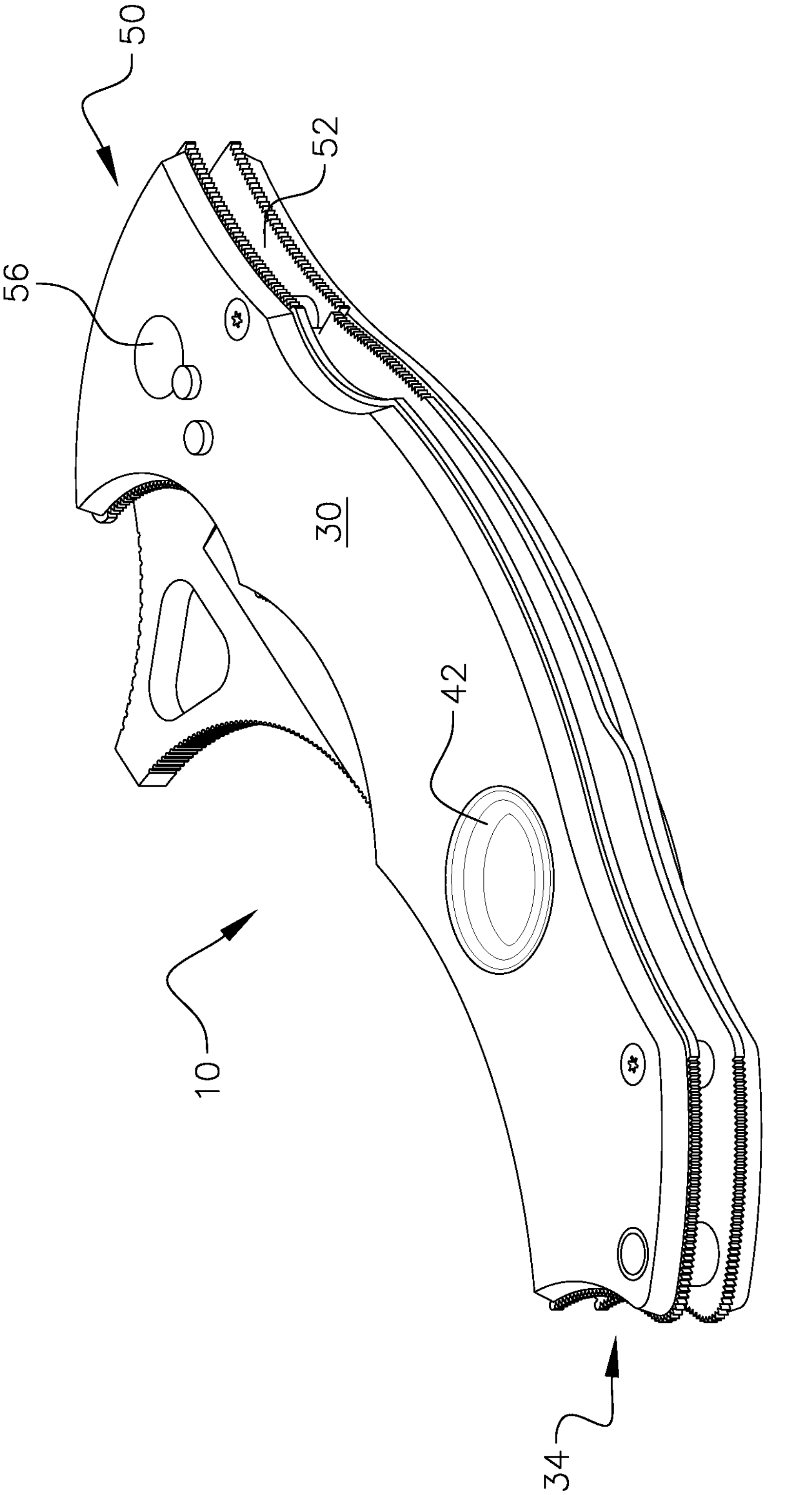
FIG. 1B is a conceptual depiction of the example of FIG. 1A on its thumb side.
Figure 1C:
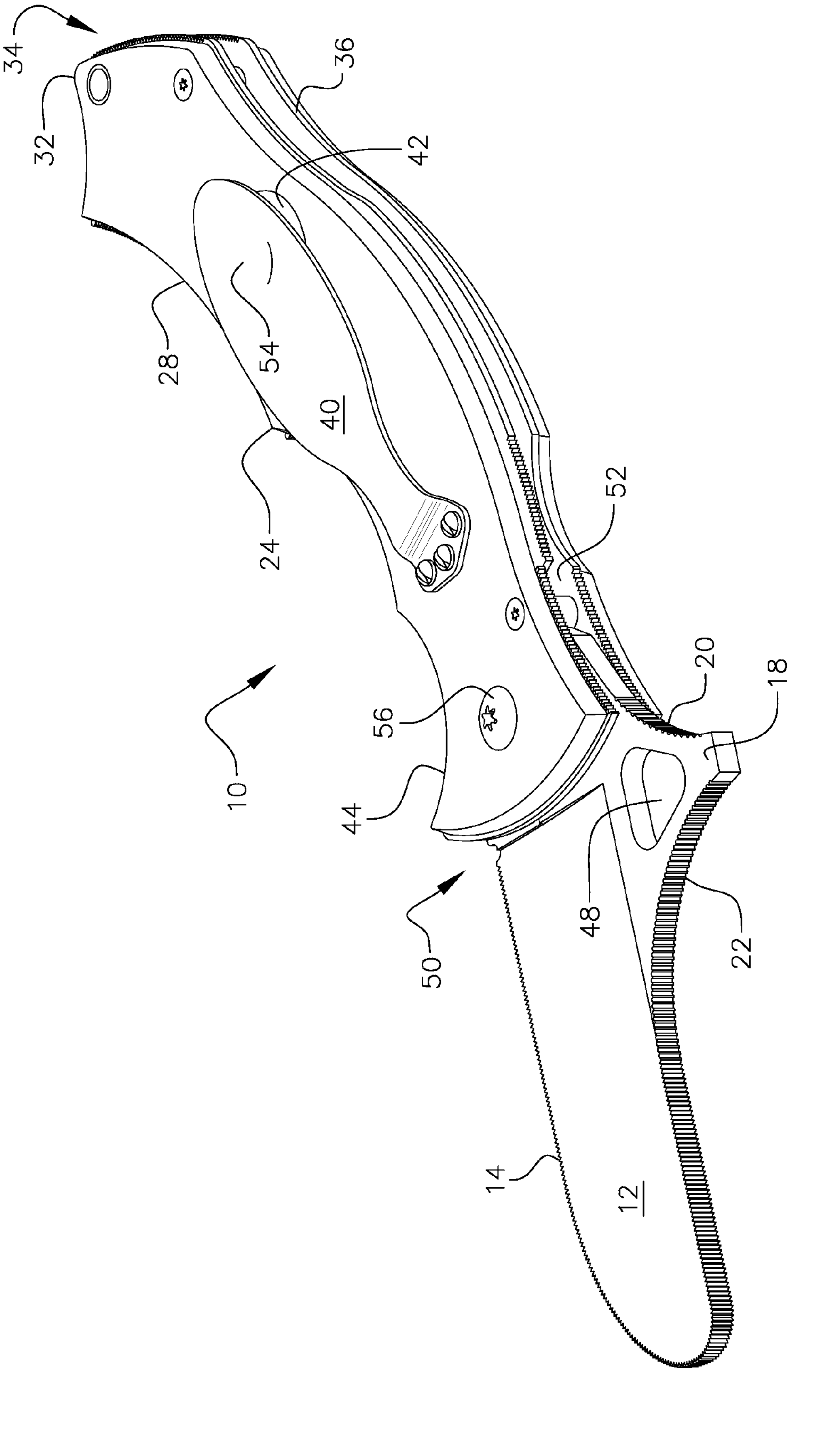
FIG. 1C is a conceptual depiction of the example of FIGS. 1A and 1B in a knife opened position.
Figure 2:
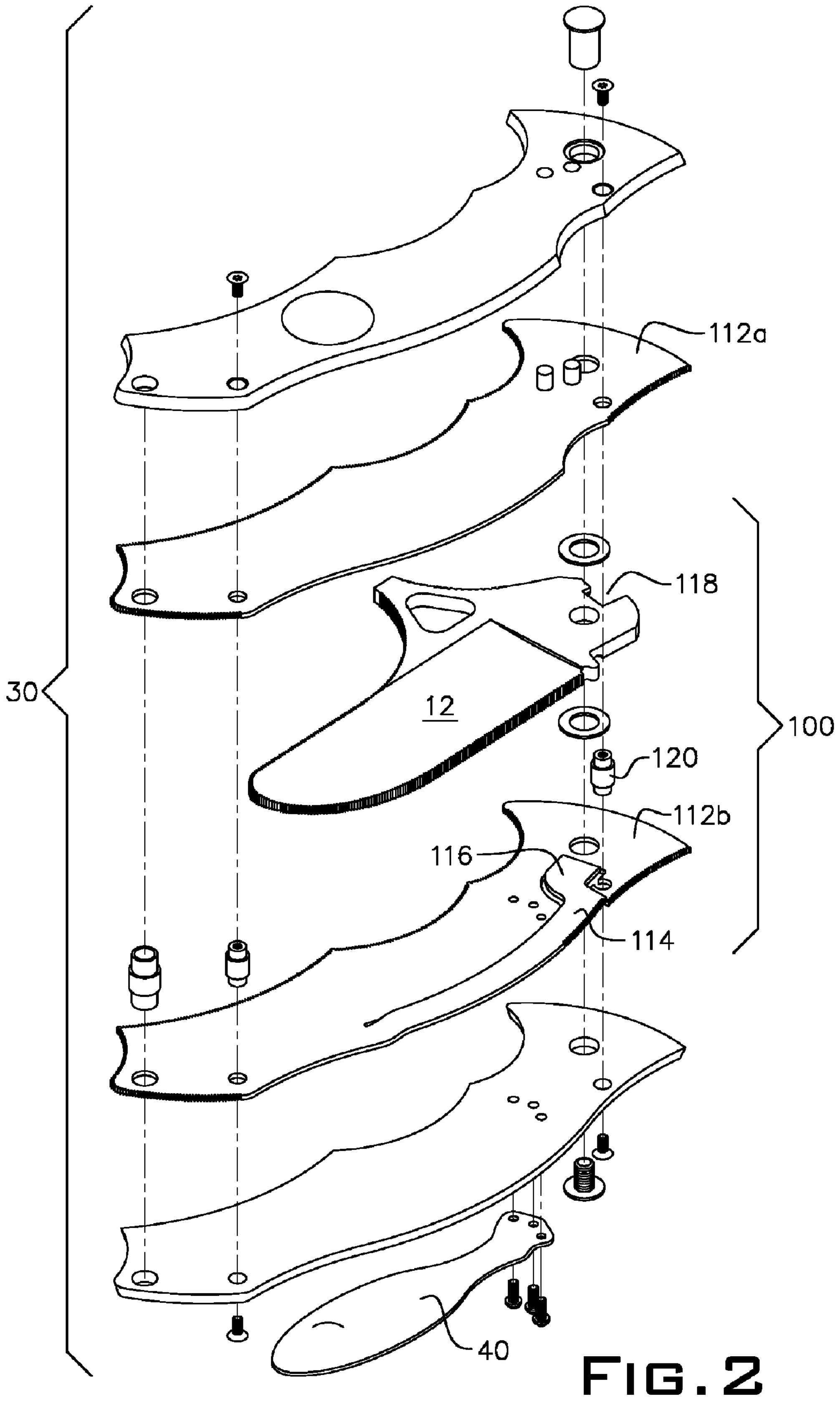
FIG. 2 is an exploded view of the handle assembly of the example of FIGS. 1A-1C with the components of the present invention shown.
Figure 3:
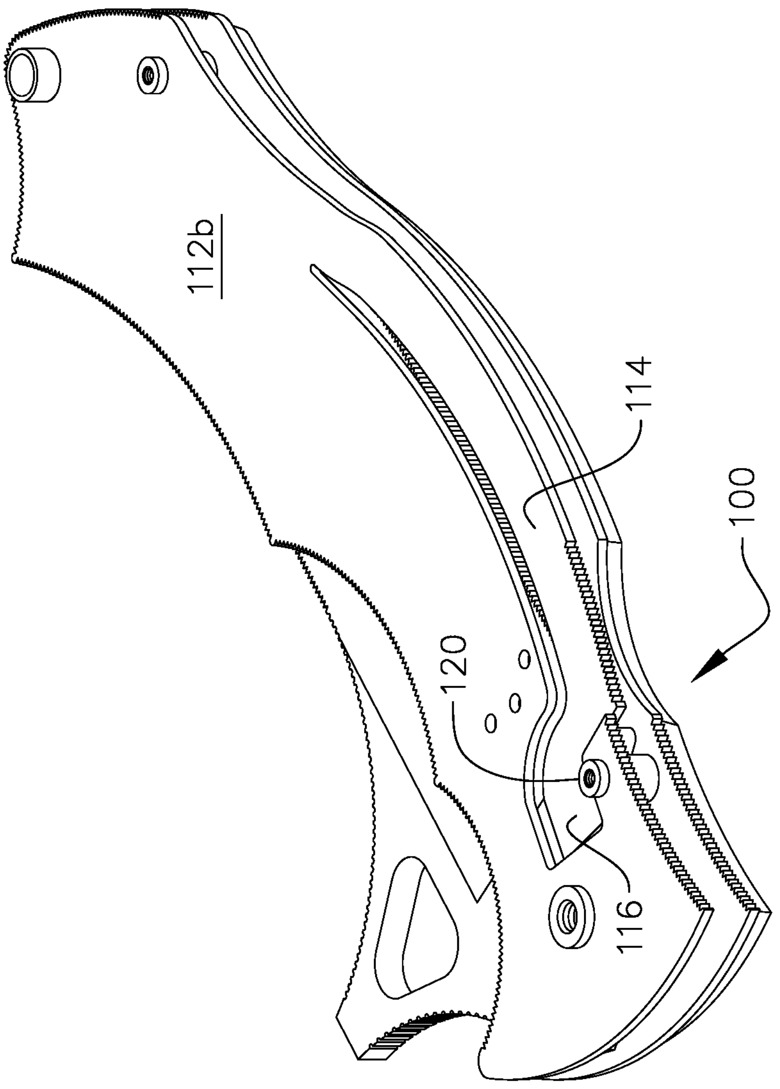
FIG. 3 is a conceptual depiction of a partially assembled knife handle assembly exposing a handle liner on the top with the tang and male puzzle lock portion partially exposed.

To assist the reader in understanding typical components of a knife or tool in which the inventive puzzle locking mechanism 100 may be incorporated, the following numbering and associated list of features are provided herein regarding one example of such a knife or tool. In the example of a knife or tool (generically referred to hereinafter as knife) depicted in the accompanying drawings FIGS. 1A-1C, the following features are depicted: folding knife 10, blade 12, cutting edge 14 of blade, extended thumb ramp 18, posterior curve 20 of thumb ramp, interior curve 22 of thumb ramp, handle horns 24, handle flares 28, handle assembly 30, handle finger retention point 32, handle butt end 34, handle posterior curve 36, handle length 38, clip 40, handle dimple 42, handle interior lower guard 44, finger opening aperture 48, handle forward end 50, handle cavity 52, clip spoon 54 and pivot point 56. Many of the above features are also shown in U.S. Pat. No. 6,725,545 to the inventor herein, which is incorporated by reference herein. Not all of the above features need to be incorporated in a knife to accommodate the invention herein. The above features are merely descriptive of one example of a knife/tool designed by the inventor herein, in which the invention has been incorporated.

Referring to FIGS. 2-7, an example of the present invention is a puzzle locking mechanism 100 in combination with a folding knife or tool 10. Generically, any reference herein to "blade" is synonymous with "tool" as the foldable tool need not necessarily be a shaped cutting edge tool. The invention therefore generally comprises a handle (also generically referred to as handle assembly) 30 having a front end 50, a rear end 34 and a cavity 52 defined within the handle 30. The handle 30 can have a set of liners 112*a*, 112*b* within the cavity 52 defined within the handle 30. A knife blade or working tool 12 has a heel-butt end 12*a* with a female puzzle cavity portion 118 cut out of the rear side of the heel-butt end 12*a*, and the heel-butt end 12*a* being rotationally interconnected to the front end 50 of the handle 30 (see pivot point 56) wherein the knife blade 12 travels between an extended position and a closed position with the knife blades cutting edge 14 positioned within the handle cavity 52. A stop pin 120 is positioned within an upper edge of the handle cavity 52 for engaging and stopping basic rotation of the blade 12 upon extending or exposing the blade 12 and allowing the matching male puzzle portion 116 at the forward end of the tang 114 and female puzzle cavity portion 118 to engage each other snugly and interconnectively.

Figure 4:
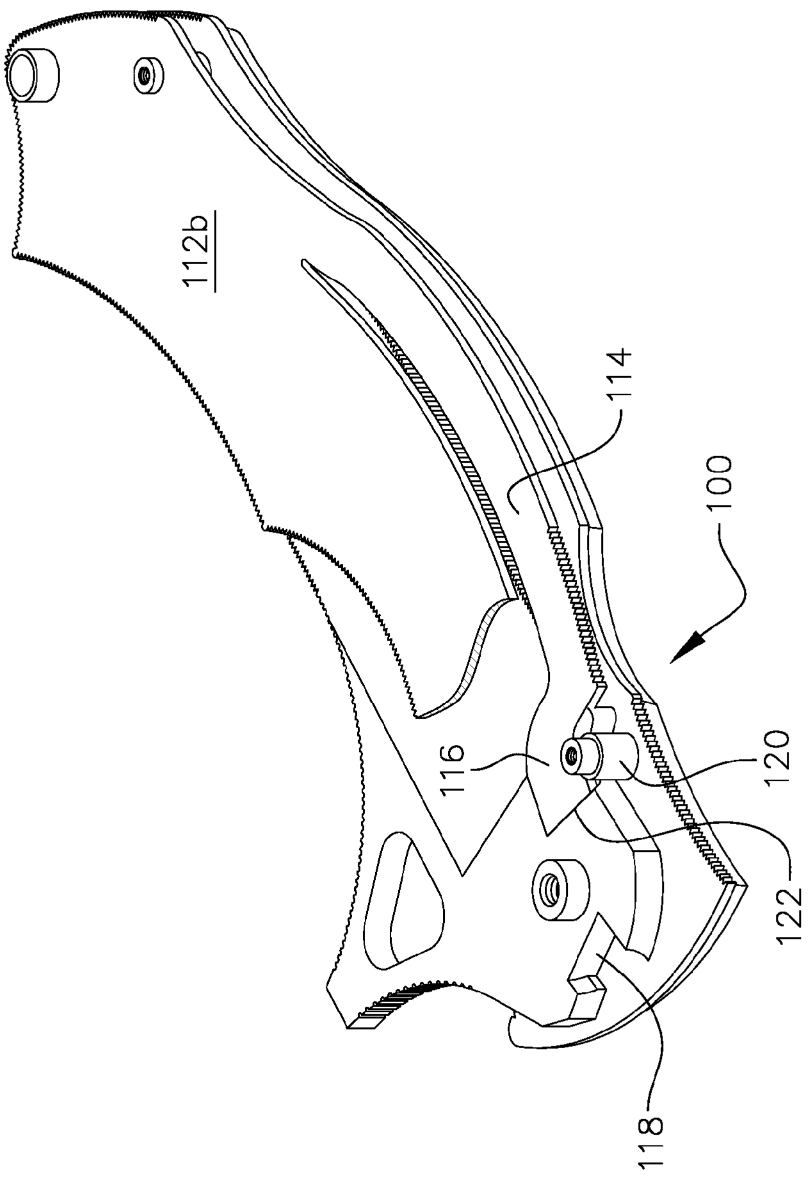
FIG. 4 is a conceptual depiction of a partially assembled knife handle assembly exposing a handle liner on the top with the tang and male puzzle lock portion as well as the female puzzle lock portion on the blade.
Figure 5:
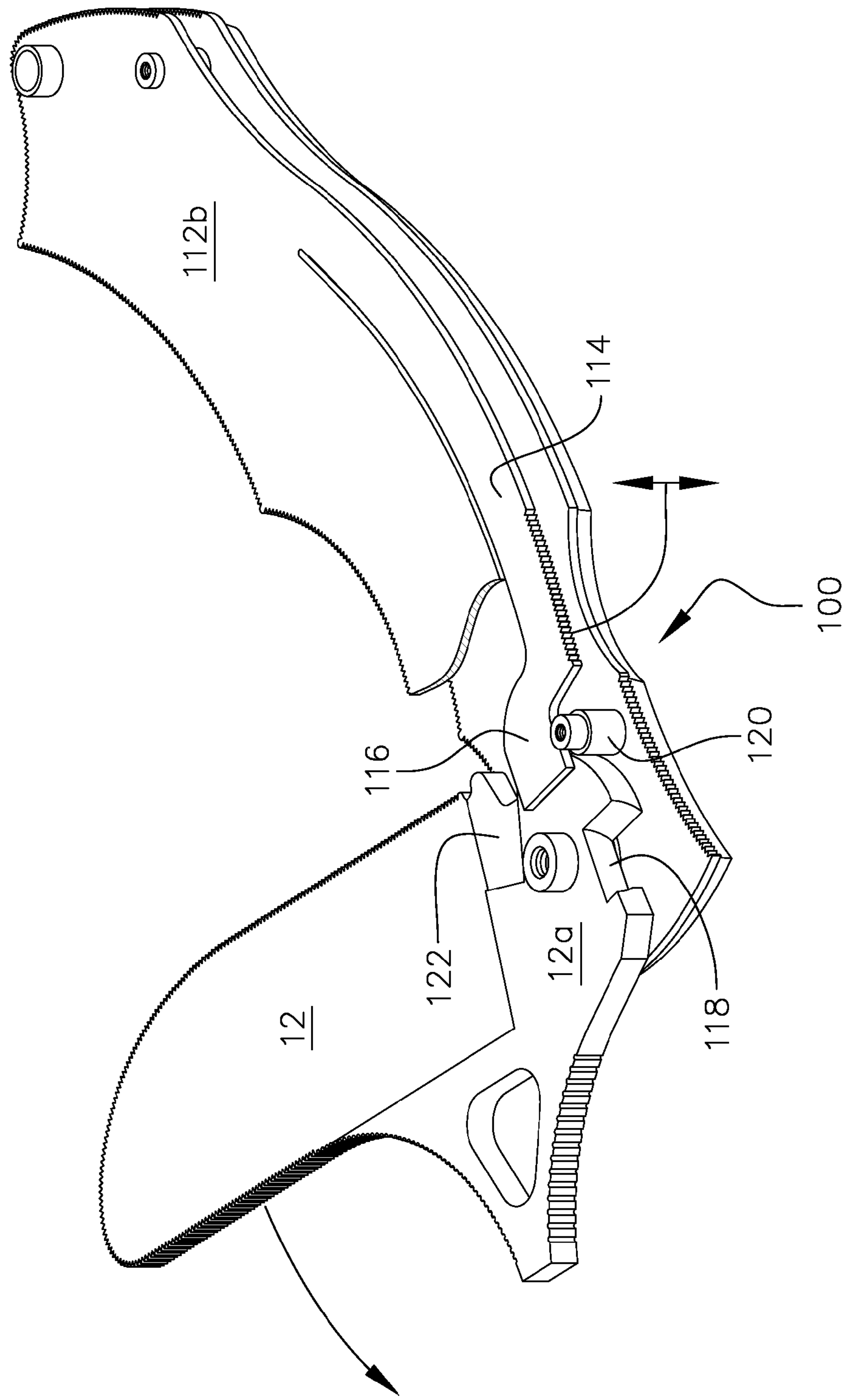
FIG. 5 is a depiction similar to FIG. 4 with the blade in a partial open or extended position and the tang portion has been pushed up to disengage the blade and allow it to rotate.
Figure 6:
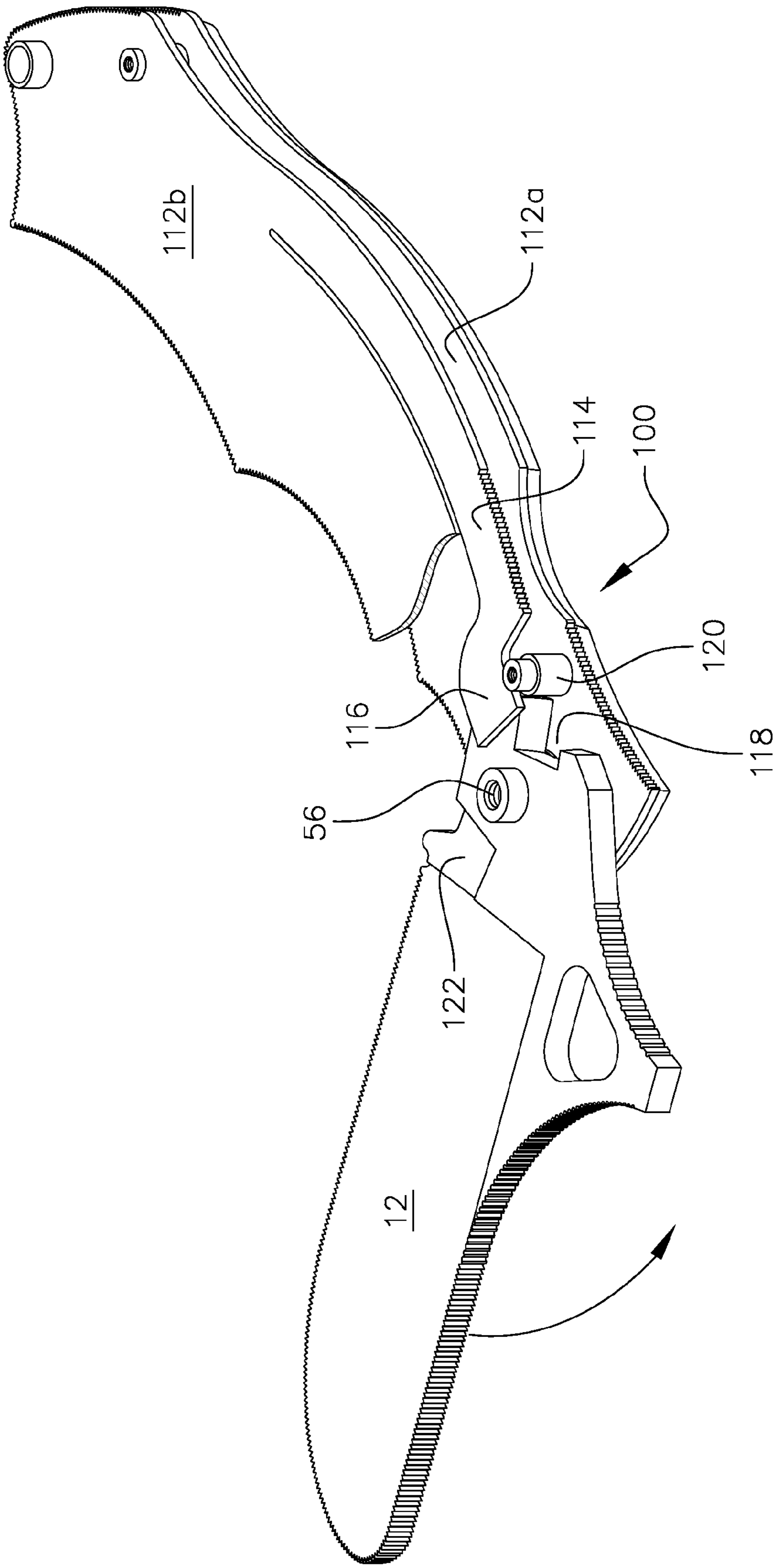
FIG. 6 is a depiction similar to FIG. 5 with the blade continuing to rotate.
Figure 7:
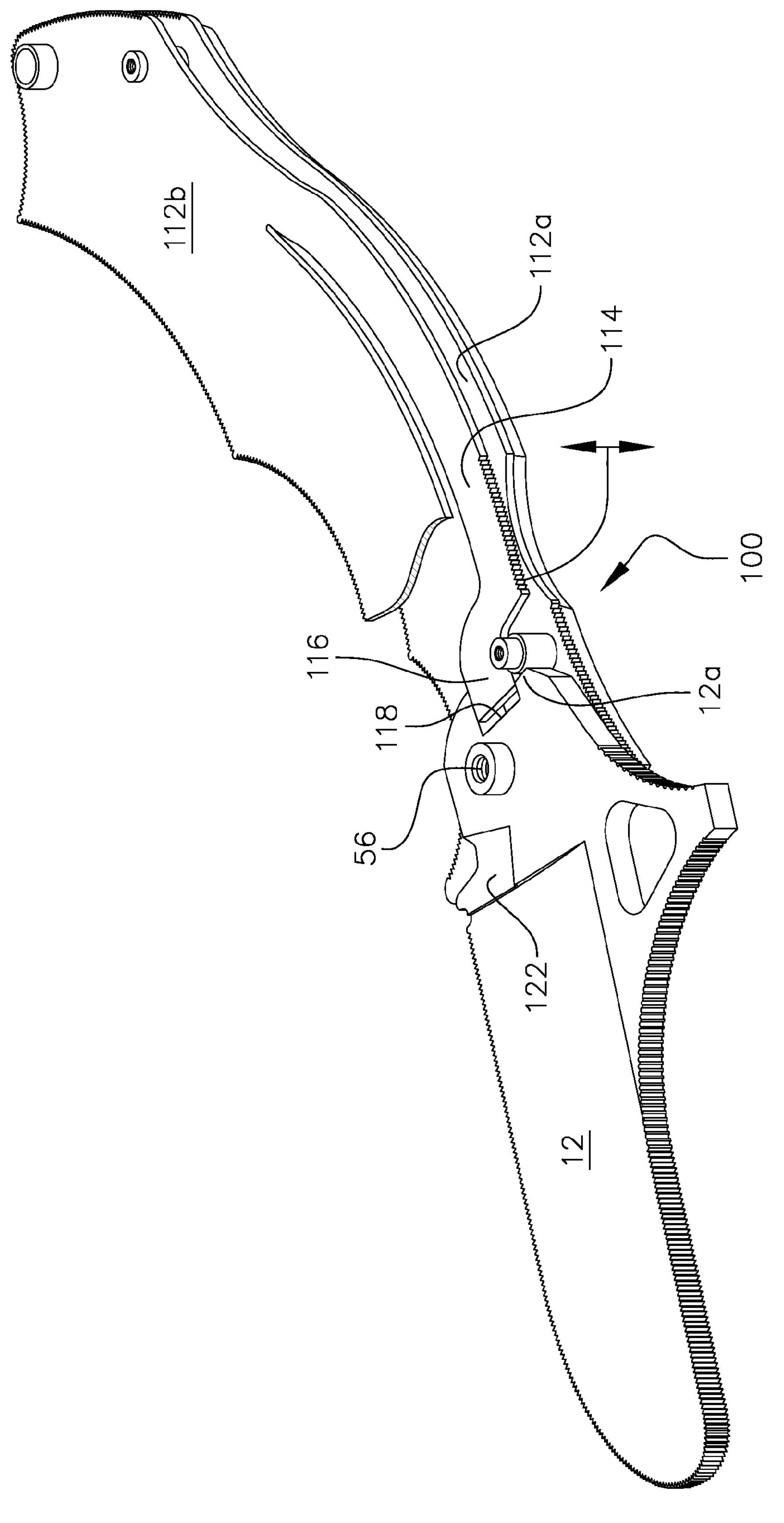
FIG. 7 is a depiction of the knife of FIG. 6 with the blade fully extended and the puzzle lock re-engaged and the butt end of the blade in contact with the stopper.

The locking mechanism 100 is positioned proximate to the handle cavity 52. In one embodiment, the locking mechanism 100 has a male puzzle portion 116 at the end of a tang 114 releasing from the liner 112*b* of the scale within the handle cavity 52, and positioned to interlock with the matching female puzzle cavity 118 within the heel-butt portion 12*a* of the blade 12 and the stop pin 120 when the knife blade 12 is in the extended position or exposed for a position of use, blade motion is stopped, allowing the male puzzle piece 116 to slip into and interlock with the female puzzle cavity 118 within the rear butt heel portion 12*a* of the blade 12 on the extended knife blade. In this position, when pressure is applied downward on the upper edge or back of the knife blade 12, the male puzzle tang 116,114 is snugly interconnected and locked within the female puzzle cavity 118 of the blade and both the puzzle pieces 116,118 interlock positively to prevent inadvertent closing of the knife blade 12 and to eliminate forward and backward motion of the extended blade 12. As shown in FIG. 4, when the knife is in a closed position, the male puzzle tang 116,114 locks into opening female portion 122 shown in FIGS. 5-7.

The knife blade 12 can have a female detent, dimple or simple female puzzle cavity on the locking side of the blade to secondarily engage and lightly interconnect the male puzzle tang 116,114 piece of the enclosed scale or liner 112*b* when the blade 12 is closed or contained within the handle cavity 52 holding the blade 12 closed within.

Figure 8A:
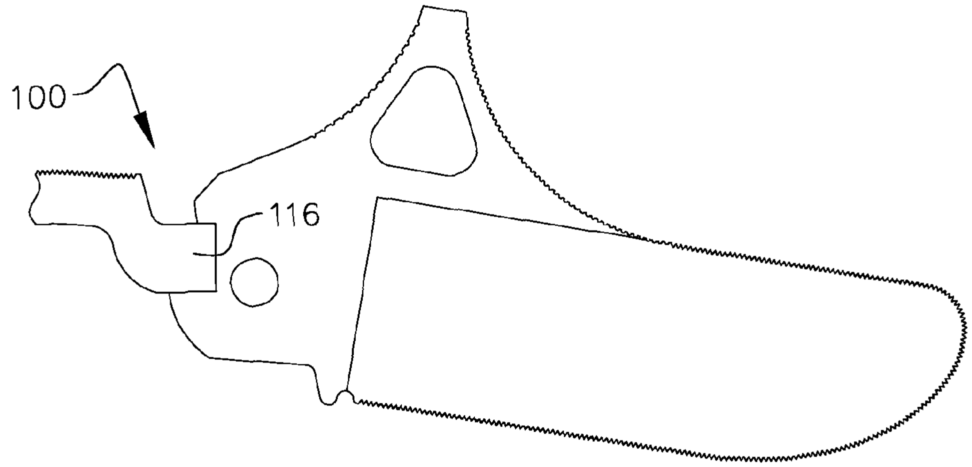
FIG. 8A is a conceptual depiction of an example of a simple configuration for a puzzle locking mechanism.
Figure 8B:
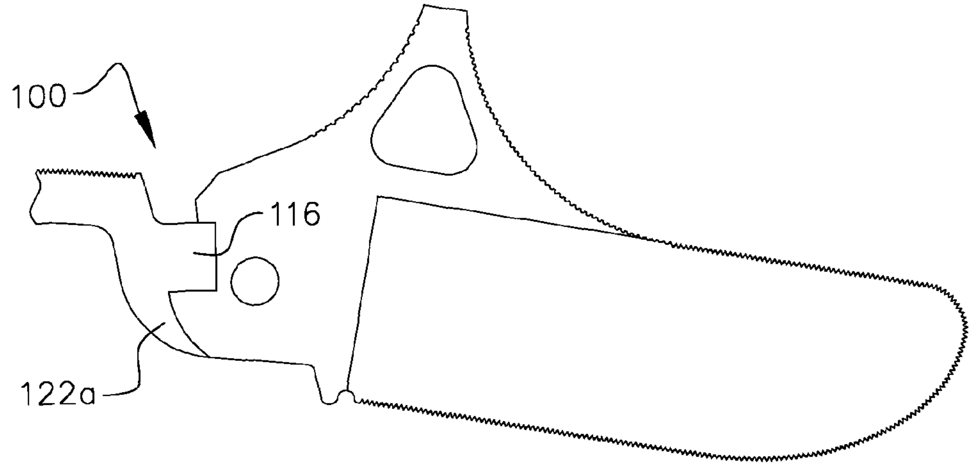
FIG. 8B is a conceptual depiction of an example of a compound configuration for a puzzle locking mechanism.
Figure 8C:
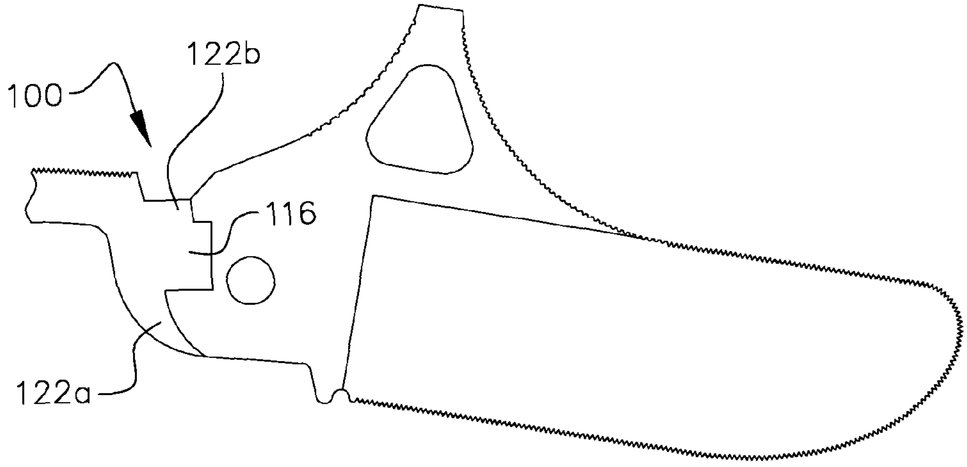
FIG. 8C is a conceptual depiction of an example of a complex configuration for a puzzle locking mechanism.
Figure 8D:
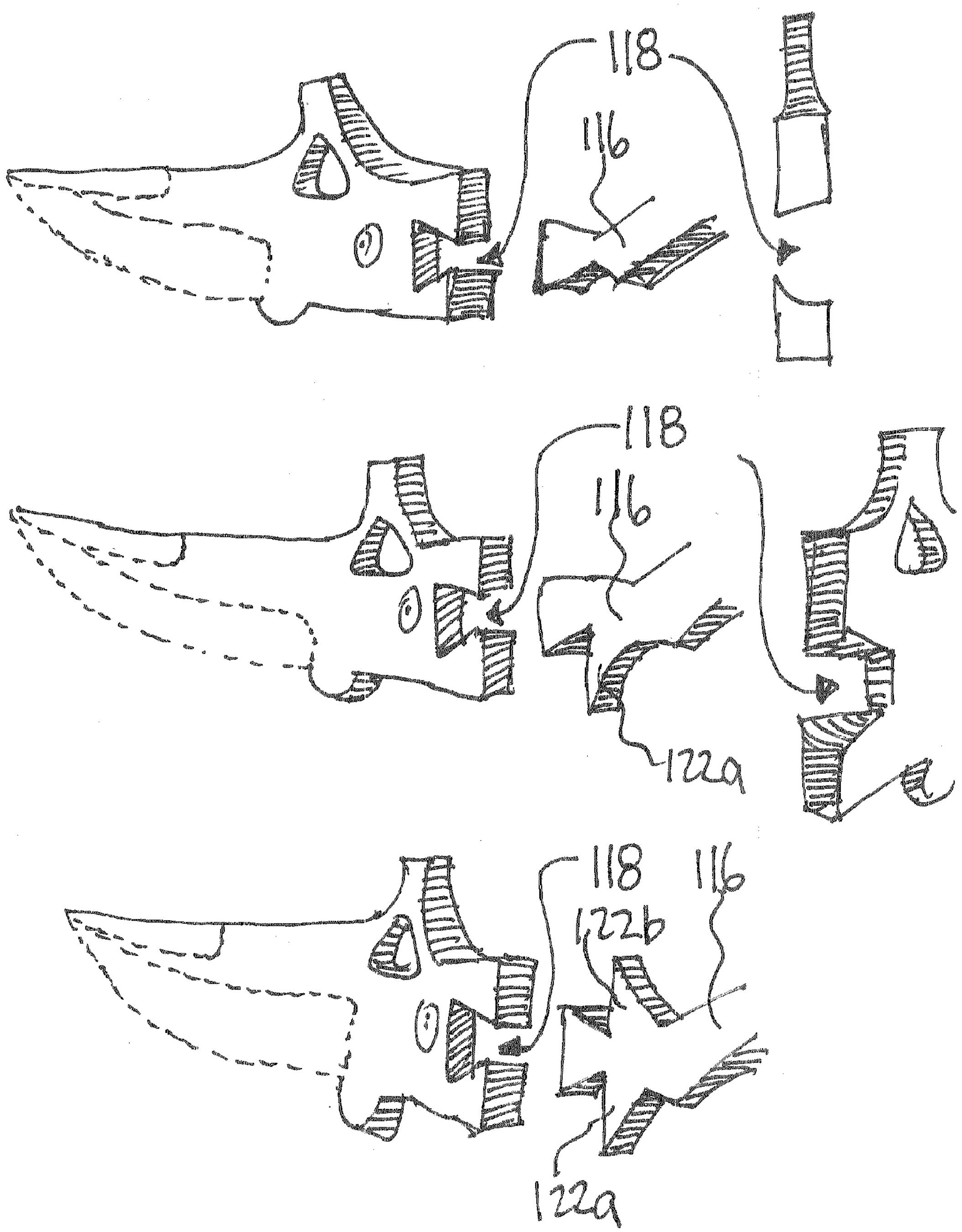
FIG. 8D is a more detailed conceptual depiction of typical dovetail configurations similar to those of FIGS. 8A-8C

As shown in the conceptual depictions of FIGS. 8A-8D, the type of locking mechanism contemplated as within the scope of the present invention can include three levels of complexity as with regular puzzles pieces. They include a simple puzzle lock (FIG. 8A and a corresponding more detailed example in FIG. 8D) where the end of the tang 114 includes the male puzzle portion 116 (that is, a simple protruding head), a compound puzzle lock (FIG. 8B and the corresponding more detailed example in FIG. 8D) where the end of the tang 114 includes the male puzzle portion 116 and an additional portion 122*a*,122*b* of the tang 114 that mates one side or the other of the butt of the blade (in the FIG. 8B and the corresponding more detailed example in FIG. 8D, the additional portion extends below the male puzzle interlocking portion (that is, a protruding head with a simple side 122*a*) but could instead extend above the male puzzle interlocking portion as shown in FIG. 8C and the corresponding more detailed example in FIG. 8D), and a complex puzzle lock (FIG. 8C and the corresponding more detailed example in FIG. 8D) with a protruding head with upper 122*a* and lower 122*b* sides. With upper 122*a* or lower 122*b* sides or both 122*a*,122*b*, the blade is forced to hold in several directions at once.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A locking mechanism for a folding knife or tool comprising:

a handle having a front end, a rear end and a cavity defined within the handle;

a knife or tool blade having a heel-butt end with a female puzzle channel cavity portion cut out of a rear side of said heel-butt end, and the heel-butt end being rotationally interconnected to said front end of said handle wherein said knife or tool blade travels between an extended position and a closed position within said handle cavity;

a liner within said handle cavity; and a matching male puzzle portion at an end of a tang portion, which is a part of said liner, configured for engaging snugly and interconnectively with said female puzzle channel cavity portion to form a dovetail puzzle interlocking joint when mated.

2. The locking mechanism according to claim 1, wherein said handle further comprises:

a second liner within said handle cavity spaced-apart from said liner having said tang portion.

3. The locking mechanism according to claim 1, further comprising:

a stop pin positioned within an upper edge of said handle cavity for engaging and stopping basic rotation of said blade upon extending or exposing said blade and allowing said matching male puzzle portion at said end of said tang portion to engage snugly and interconnectively with said female puzzle channel cavity portion.

4. The locking mechanism according to claim 1, wherein said tang portion is movable transversely a sufficient displacement so as to disengage said male puzzle portion from said female puzzle channel cavity portion to allow said knife or tool blade to be folded within said handle cavity.

5. The locking mechanism according to claim 1, wherein said tang portion further comprises one of:

an upper side portion above said male puzzle portion that is configured to rest against a portion of said heel butt end when said knife or tool blade is in an extended position, a lower side portion below said male puzzle portion that is configured to rest against a portion of said heel butt end when said knife or tool blade is in an extended position, or a combination of said upper and lower side portions.

* * * * *